L. L. KORACH.
LOCK NUT.
APPLICATION FILED AUG. 23, 1919.
1,380,395. Patented June 7, 1921.
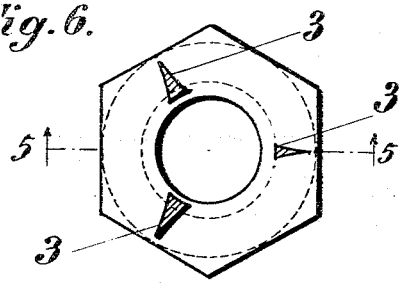
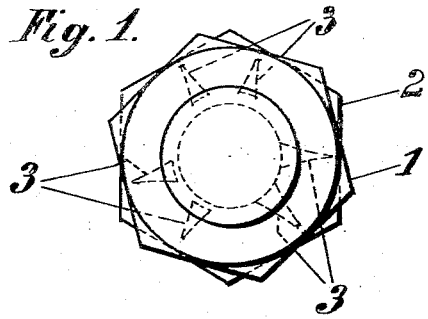
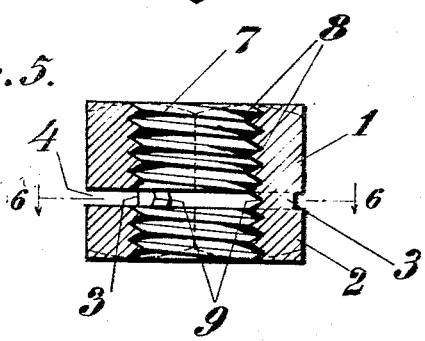
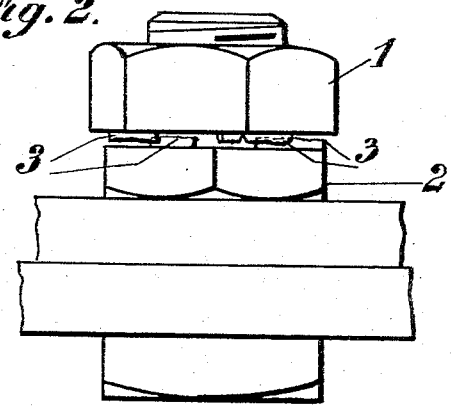
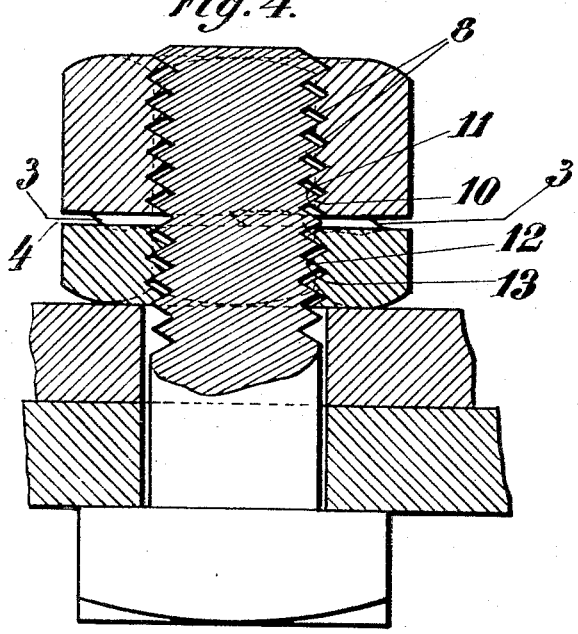
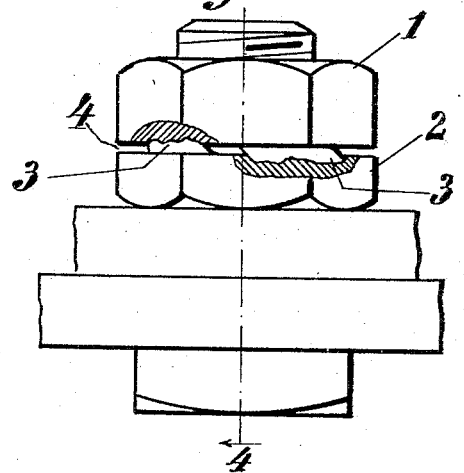
WITNESSES:
Leopold Moss
William A. Whely
INVENTOR
Louis L. Korach
BY Harry Irwin Cromer
ATTORNEY

UNITED STATES PATENT OFFICE.

LOUIS L. KORACH, OF CHICAGO, ILLINOIS.

LOCK-NUT.

1,380,395.

Specification of Letters Patent.   Patented June 7, 1921.

Application filed August 23, 1919.   Serial No. 319,452.

*To all whom it may concern:*

Be it known that I, LOUIS L. KORACH, a citizen of the United States, residing in Chicago, in the county of Cook and State of Illinois, have invented certain new and useful Improvements in Lock-Nuts, of which the following is a specification.

This invention relates to that class of lock-nuts in which the nut body is in the form of a plurality of sections or members which are normally or initially connected and spaced apart by means of connecting posts or pillars which are adapted to be fractured or broken by the turning of either of such sections with respect to the other, so as to cause the fractured posts to form teeth or projections located between and in engagement with the adjacent faces of the nut sections to hold the same in locked engagement with each other and with a threaded bolt upon and in threaded engagement with which they are adapted to be mounted.

The principal object of this invention is to provide a simple, economical and efficient lock-nut.

Other and further objects of the invention will appear from the following description and claims, and from an inspection of the accompanying drawings, which are made a part of this specification.

The invention consists in the features, combinations, details of construction and arrangement of parts herein described and claimed.

In the accompanying drawings:—

Figure 1 is a top or plan view of a lock nut constructed in accordance with my invention, showing the same in position upon a threaded bolt, as it would appear after either of the initially connected nut sections had been turned upon its axis with respect to the other to or in the direction of locking position;

Fig. 2 is a view in side elevation of the nut members shown in Fig. 1, showing the same in threaded engagement with a bolt, with the outer section turned with respect to the inner section sufficiently to fracture the connecting posts or pillars located between the main nut sections, and with the inner section in engagement with a plate or part to be held in place thereby;

Fig. 3, is a view in side elevation of the parts shown in Figs. 1 and 2, showing the upper or outer nut section in the position which it would occupy after having been turned with respect to the lower or inner nut section into position to cause the connecting posts to be fractured and converted into teeth and pressed into engagement with the adjacent surfaces of the nut sections so as to lock the sections in engagement with each other and in engagement with the threaded bolt on which they are mounted;

Fig. 4, is an enlarged view in central vertical section, taken on line 4 of Fig. 3, looking in the direction of the arrow, and showing the lock-nut members in locking position, with the intermediate connecting posts or pillars fractured and converted into teeth by turning one of the nut sections with respect to the other while in threaded engagement with a bolt;

Fig. 5, is a view in central longitudinal section of a lock nut constructed in accordance with my invention, showing the same as it would appear initially with the nut sections spaced apart and connected by means of integral connecting posts or pillars which are frangible and adapted to be broken by turning one of the nut sections with respect to the other while in threaded engagement with a bolt; and Fig. 6, is a view in transverse section taken on line 6—6 of Fig. 5, looking in the direction indicated by the arrows.

In constructing a lock nut in accordance with my invention, I provide a nut body which comprises a plurality of sections 1, and 2, which are normally spaced apart and connected in rigid relation to each other by means of a plurality of connecting posts or pillars 3, of which there are, by preference, three, said connecting posts or pillars being spaced apart or located at equal distances from each other circumferentially of the nut and at equal distances from the axial center of the nut. These connecting pillars are, by preference, integral with the nut sections which are connected thereby, or between which they are located, and are formed by milling or cutting or otherwise forming a peripheral or transverse groove 4 between the sections 1 and 2 of the nut. And it is between the nut sections 1 and 2, and in this groove 4 that the connecting pillars or posts 3 are located, as shown in the drawings.

The nut body is provided with a screw-threaded axial bore or opening 7, the helical or screw threads 8 of which are, by preference, of uniform pitch and dimensions and continuous from end to end of each section of the nut body and throughout the length of the connecting posts or pillars 3, the inner sides of which are likewise helically threaded, the helical threads 8 being broken or interrupted only at points between the connecting posts or pillars 3, by the groove 4. The threaded portions of the connecting posts is indicated by the reference numeral 9. (See Fig. 5.)

In the art to which this invention relates, it is well known that a threaded bolt, when properly proportioned, has threads of sufficient strength and of such form and dimensions, as to withstand any stresses and strains which the bolt will withstand without being distorted or broken, and that the nut or nuts to be used on such bolt should have threads and a nut body, either in one or more nut sections, of sufficient strength to withstand any stresses and strains to which the bolt can be subjected without injury. In making my improved lock nut I prefer to make the nut body—comprising a plurality of nut-sections 1 and 2—of substantially or approximately such form and dimensions as will enable it to fulfil the requirements above mentioned, but without making it any larger than is found necessary in order to enable it to operate and perform its functions in an efficient manner. And the connecting posts 3,—which are by preference made by cutting away the material of the blank or nut body originally located therebetween, after first forming the threads 8 throughout the entire length of the blank or nut body as a whole and throughout the length of the posts or pillars—are of such dimensions in cross-section as to be readily broken by the turning of either of the nut-sections 1 or 2 with respect to the other while upon and in threaded engagement with a bolt, and without distorting or injuring the threads of either the nut or the bolt. The posts 3 are, in practice, thus broken by the turning of the outer nut member 1 with respect to the inner nut member 2 while the nut sections are in threaded engagement with a bolt, thereby converting each post 3 into a pair of opposed teeth each having a rough end surface formed where the fracture is produced. The turning of the outer nut member with respect to the inner nut member, whereby the connecting posts are fractured, is continued, thereby causing the rough surfaced and rough edged teeth located between the nut-sections to be pressed tightly and with great force into tightly fitting biting frictional or locking engagement with the adjacent surfaces of the nut-sections, so that the nut-sections between which the fractured posts or teeth are located are securely held in locking engagement with each other and with the threaded bolt on which they are mounted.

The connecting posts before being broken, are, by preference, of less length in a direction parallel with the axial center of the nut than they are wide at their shortest diameter; and they are, by preference, approximately triangular in cross-section, but with their sides curved or concave. They are inflexible, and adapted to be readily fractured or broken by the first turning movement of either of the connected nut-sections with respect to the other, and without being bent, and a continuation of the turning movement will bring the locking teeth into locking engagement with the adjacent surfaces of the nut sections and cause the latter to be securely held in locking engagement with each other and with the bolt. The posts being frangible, are thus adapted to be broken without being bent, and by the application of force which is insufficient to mutilate or injure or distort the threads of the nut or bolt. And when the parts are thus brought into locking engagement, it is plain that the nut sections and bolt coact in such a manner that the outer surface 10 of the thread of the nut section 1 is forced against and held in tight engagement with the inner surface 11 of the bolt thread, and the surface 12 of the thread of the inner nut-section 2 is forced against and held in tight engagement with the adjacent surface 13 of the bolt thread. (See Fig. 4.)

The connecting posts 3 should be of such dimensions and construction and so arranged, that they will serve to connect and hold the nut sections 1 and 2 spaced apart and in rigid relation during handling and transportation, and to guide the outer nut member onto the threaded bolt in such a manner that the threads of both nut members will properly engage the threads of the bolt, but should be capable of being readily broken in the manner above described, when the nut-sections have been turned to the desired position for breaking the posts and locking the nut-sections in engagement with each other and with the bolt. And I do not limit myself to the exact construction, relative dimensions, proportions or arrangement of parts herein described, or shown, otherwise than as set forth in the claims.

In Figs. 2, 3 and 4, the fractured connecting posts, or the teeth formed thereby, are shown somewhat exaggerated, for the purpose of clearly illustrating the construction and mode of operation of the parts.

In Figs. 1, 5, and 6 of the drawings, the connecting posts are shown so constructed and arranged that the longest diameter in cross-section of each post is disposed radially of the nut; and the shortest diameter in cross-section is through the center of the post substantially at right angles to the longest diameter, or at right angles to a radial line through the center of the post.

I claim:

1. A lock nut comprising in its construction a plurality of nut-sections normally spaced apart and each having a screw-threaded axial opening adapted to receive and engage a screw-threaded bolt, and a plurality of threaded frangible connecting posts integral with and located between and normally connecting said nut sections, said posts being spaced apart and adapted to be broken into two sections forming opposed locking teeth between and in frictional abutting engagement with the opposed nut sections by the turning of one of said nut-sections with respect to and into locking engagement with the other nut-section.

2. A nut lock comprising in its construction two nut-sections normally spaced apart and having a screw-threaded axial opening therethrough adapted to receive and engage a screw-threaded bolt, and a plurality of threaded frangible connecting posts integral with and located between and normally connecting said nut sections in rigid relation to each other, said posts being inflexible and adapted to be broken by turning one of said nut-sections with respect to the other, to form locking teeth adapted to be forced into frictional locking engagement with adjacent faces of said nut-sections, to hold said nut-sections in locked position.

3. A lock nut comprising in its construction two nut-sections normally spaced apart and having a screw-threaded axial opening therethrough adapted to receive and engage a screw-threaded bolt, and a plurality of threaded frangible connecting posts integral with and located between and normally connecting said nut sections in rigid relation to each other, each of said posts being inflexible and of less length in a direction parallel to the axis of the nut than such post is wide at its shortest diameter in cross-section, and adapted to be broken by turning one of said sections with respect to the other without injury to the threads of the nut or bolt, to form locking teeth for engaging and holding the nut sections in locking position.

Signed at Chicago, in the county of Cook and State of Illinois, this 21st day of August, 1919.

LOUIS L. KORACH.

Witnesses:
HARRY I. CROMER,
M. HARDING.